Dec. 12, 1939. A. F. HAMILTON Des. Re. 21,292
GAME BOARD
Original Filed March 6, 1939
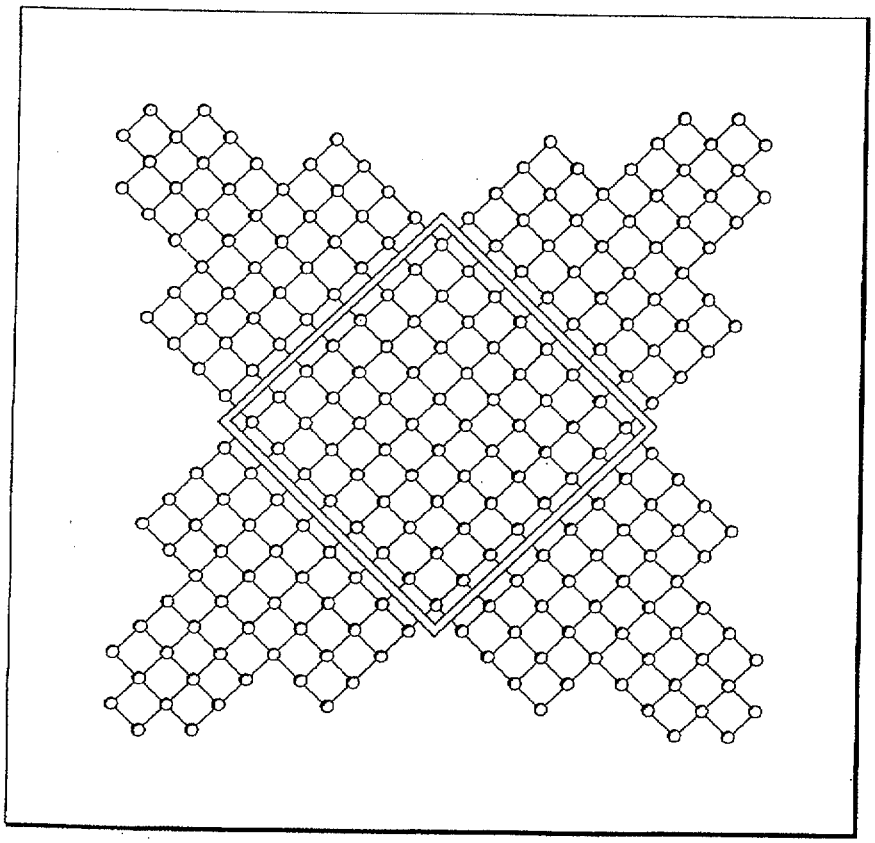
Inventor
Alfred F. Hamilton
By
Charles L. Reynolds
Attorney Reissued Dec. 12, 1939

Des. Re. 21,292

UNITED STATES PATENT OFFICE 21,292

DESIGN FOR A GAME BOARD

Alfred F. Hamilton, Seattle, Wash.

Original No. 115,550, dated July 4, 1939, Serial No. 83,355, March 6, 1939, 3½ years. Application for reissue September 26, 1939, Serial No. 87,388. Term of patent 3½ years

*To all whom it may concern:*

Be it known that I, Alfred F. Hamilton, a citizen of the United States, residing at Seattle, in the county of King and State of Washington, have invented a new, original, and ornamental Design for Game Boards, of which the following is a specification, reference being had to the accompanying drawing, forming part thereof.

The figure is a plan view of the game board, showing my new design.

The game board is of no appreciable or substantial thickness. The small circles represent holes through the board, the surface of which is lined, as shown.

I claim:

The ornamental design for a game board, substantially as shown and described.

ALFRED F. HAMILTON.